United States Patent
King (10) Patent No.: US 6,529,286 B1
(45) Date of Patent: Mar. 4, 2003

(54) DYNAMIC PRINTING INTERFACE FOR ROUTING PRINT JOBS IN A COMPUTER NETWORK

(75) Inventor: Edward Winslow King, Fountain Valley, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,423

(22) Filed: Dec. 22, 1998

(51) Int. Cl.$^7$ ............................................. G06K 15/00
(52) U.S. Cl. ........................ 358/1.14; 358/1.9; 358/1.1
(58) Field of Search .............................. 358/1.14, 1.15, 358/1.9, 1.5, 1.1, 401, 400

(56) References Cited

U.S. PATENT DOCUMENTS

| | | | |
|---|---|---|---|
| 5,287,194 A | | 2/1994 | Lobiondo .................... 358/296 |
| 5,467,434 A | | 11/1995 | Hower, Jr. et al. .......... 395/114 |
| 5,471,564 A | | 11/1995 | Dennis et al. ............... 395/114 |
| 5,559,933 A | | 9/1996 | Boswell ....................... 395/114 |
| 5,625,757 A | | 4/1997 | Kageyama et al. ......... 395/113 |
| 5,651,114 A | | 7/1997 | Davidson, Jr. .......... 395/200.02 |
| 5,684,934 A | | 11/1997 | Chen et al. .................. 395/113 |
| 5,696,894 A | | 12/1997 | Ono ............................. 395/114 |
| 5,727,135 A | | 3/1998 | Webb et al. ................. 395/113 |
| 5,729,685 A | | 3/1998 | Chatwani et al. ...... 395/200.11 |
| 5,802,420 A | * | 9/1998 | Garr ............................. 399/27 |
| 6,031,624 A | * | 2/2000 | Murphy ...................... 358/1.17 |
| 6,052,198 A | * | 4/2000 | Neuhard ..................... 358/1.15 |
| 6,337,745 B1 | * | 1/2002 | Aiello ......................... 358/1.15 |

FOREIGN PATENT DOCUMENTS

| WO | WO97/32274 | * | 9/1997 | .......... G06K/15/00 |
|---|---|---|---|---|

\* cited by examiner

*Primary Examiner*—Jerome Grant, II
(74) *Attorney, Agent, or Firm*—Fitzpatrick, Cella, Harper & Scinto (57) ABSTRACT

A dynamically shared printing interface (DDSPI) in a computer network that routes print jobs to printers in a user defined preferred printer list (PPL) based upon a printer's capability to print a certain job when the print job is requested. A user sends a print job to the DDSPI that calculates the estimated workload to print the job designated as a task allocation property (TAP), sends a multi-cast to the printers in the PPL requesting printer capability information designated as a printer power index (PPI), receives the PPI from the printers in the PPL that calculate their own capability, compares the PPI with the TAP, routes the print job whose PPI best matches with the TAP and notifies the user of the printer to which the job is routed. The printers in the PPL calculate their own PPI's based upon the printer engine speed, printer memory size, number, size and complexity of print jobs waiting in the printer queue at the instance the multi-cast is received. In another aspect the DDSPI re-routes a print job if the original printer develops an error and cannot print the job, by re-sending a multi-cast to the other printers in the PPL requesting printer PPI's, receiving PPI's from the printers that re-calculate their PPI, compare the TAP with the resent PPI's, re-route the print job whose PPI best matches the TAP and re-notify the user of the printer to which the job is re-routed.

61 Claims, 8 Drawing Sheets

PRINTER BLOCK DIAGRAM

DYNAMIC PRINTING INTERFACE FOR ROUTING PRINT JOBS IN A COMPUTER NETWORK

FIELD OF THE INVENTION

The present invention relates to computer network printing systems and specifically to a dynamically shared printer interface which can dynamically calculate the capability of network printers and route print jobs to the best available printer.

DESCRIPTION OF THE RELATED ART

Conventionally in computer networks, printers are shared among various users. Most users in the Windows environment have installed multiple printer drivers on their systems and a particular printer is selected as a default printer. The default printer may be a standalone printer or a network printer that may be utilized by other users. Whenever a user wants to print, a print job is sent to the default printer, unless the user selects another printer before sending the print job.

There are various factors that determine the capability of a printer to print a certain job at any given time, for example printer engine speed, printer memory size and/or number and nature of print jobs in the printer queue. Hence a default printer may not always be the best printer to print a certain job because of low printer engine speed, small printer memory size and/or numerous print jobs that may already be waiting in the print queue. Hence for optimum utilization of printer resources in a computer network it is essential to know the capability of a printer before a print job is sent to that printer.

Currently, if a user is aware that a default printer has numerous print jobs in the printer queue, the user may select another printer manually. However this process is time consuming and inefficient because a user has to manually evaluate individual printers and assess their capabilities every time a print job needs to be completed. Current network printing systems do not dynamically evaluate printer capability that is based upon a printer's engine speed, memory size and the size and/or nature of the print job in the printer queue at the time a user wants to print.

Another shortcoming of current network printing systems is that there are no mechanisms by which a print job is automatically re-routed to the next best available printer, if the original printer gets jammed or otherwise develops an error preventing the printer from successfully completing the print job. In the prior art there are mechanisms that allow an error message to be sent to the user, however if the user is not available, the print job is not automatically re-routed to the next available printer suitable for completing the print job. Hence there is a need for a dynamic printer interface that can ascertain the capabilities of network printers prior to routing a print job and also provide a degree of fault tolerance by re-routing the print job if the printer develops an error during printing.

SUMMARY

It is therefore the object of the present invention to provide a printing system that addresses the foregoing problems of conventional network printing systems by evaluating the size and complexity of a print job, estimating the work load for printing a print job, querying network printers for printer capability information, calculating the capabilities of the printers in response to the query, comparing the printer capability with the estimated workload and selecting the most optimum printer for the print job.

In another aspect, the invention provides a printing system that notifies a user of any printer error that occurs during printing, re-routes the print job to the next best available printer and then informs the user of the printer to which the print job is re-routed.

More specifically, the present invention concerns a dynamically distributed shared printer interface (DDSPI), which is a software module located either on a network server or on a user's personal computer, and calculates the estimated workload to a print a certain print job, queries the printers that are preferred by the user for printer capability information, receives printer capability information from the printers, compares printer capability with the estimated printer workload and routes the print job to the best available printer for the print job. Before a print job is sent to a particular printer, a user chooses a set of printers where a user prefers to print jobs. The set of printers constitutes a preferred printer list (PPL), which is stored in a location from where the DDSPI can access the PPL preferably on the network server.

At any given time, the user sends a print request to the DDSPI, which calculates the estimated workload required to print the job. The estimated workload is designated as the task allocation property (TAP) and is based upon the size and complexity of the print job. Thereafter, the DDSPI sends a multi-cast to the printers in the user defined PPL, requesting each printer to calculate its printer capability as a printer power index, which is then returned to the DDSPI. Thereafter, the DDSPI compares the task allocation property of the print job with the printer power indexes of the printers in the preferred printer list and the printer with the printer power index value closest to the TAP is selected to print the job.

The printers in the preferred printer list that are up and running at the instance of the DDSPI multicast calculate their own printer capability and transmit it back to the DDSPI. The printer capability, designated as printer power index is based upon the printer engine speed, printer memory size, size, complexity and number of other print jobs that are already in the printer queue. The printer receiving the multi-cast calculates the printer power index that is based upon the above factors and sends the printer power index to the DDSPI.

Hence the present invention efficiently utilizes printing resources in a computer network because the most suitable printer is chosen to print a certain print job. Furthermore, since the printer capability is calculated real time that is every time a print job is requested, the present invention determines printer capability dynamically and hence consistently uses the most optimum printer for a print job.

In yet another aspect of the invention, the printing system of the present invention provides a fault tolerance if the above chosen network printer develops an error and is unable to successfully complete the printing process. When the printer chosen for the print job develops an error while printing, the printer notifies the DDSPI, which in turn notifies all the users that may have a job in the printer queue. Thereafter, DDSPI re-sends a multi-cast to the other printers in the PPL requesting printer capability information, designated as printer power index.

The printers receiving the re-sent multi-cast re-calculate their own capability based upon printer engine speed, printer memory size, number, size and complexity of print jobs in the printer queue at the instant the re-sent multi-cast is received. The re-calculated printer power index is sent to the DDSPI and thereafter the re-sent PPI's are compared to the task allocation property of the print job. The DDSPI re-routes the print job to the printer with the PPI closest to the TAP and notifies the user of the printer identity.

Therefore, the present invention provides a fault tolerance to a network printing system by effectively notifying the user of printer error's and re-routing print jobs to the next best available printer in the network and hence printing resources are efficiently utilized.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENT

Figure 1:
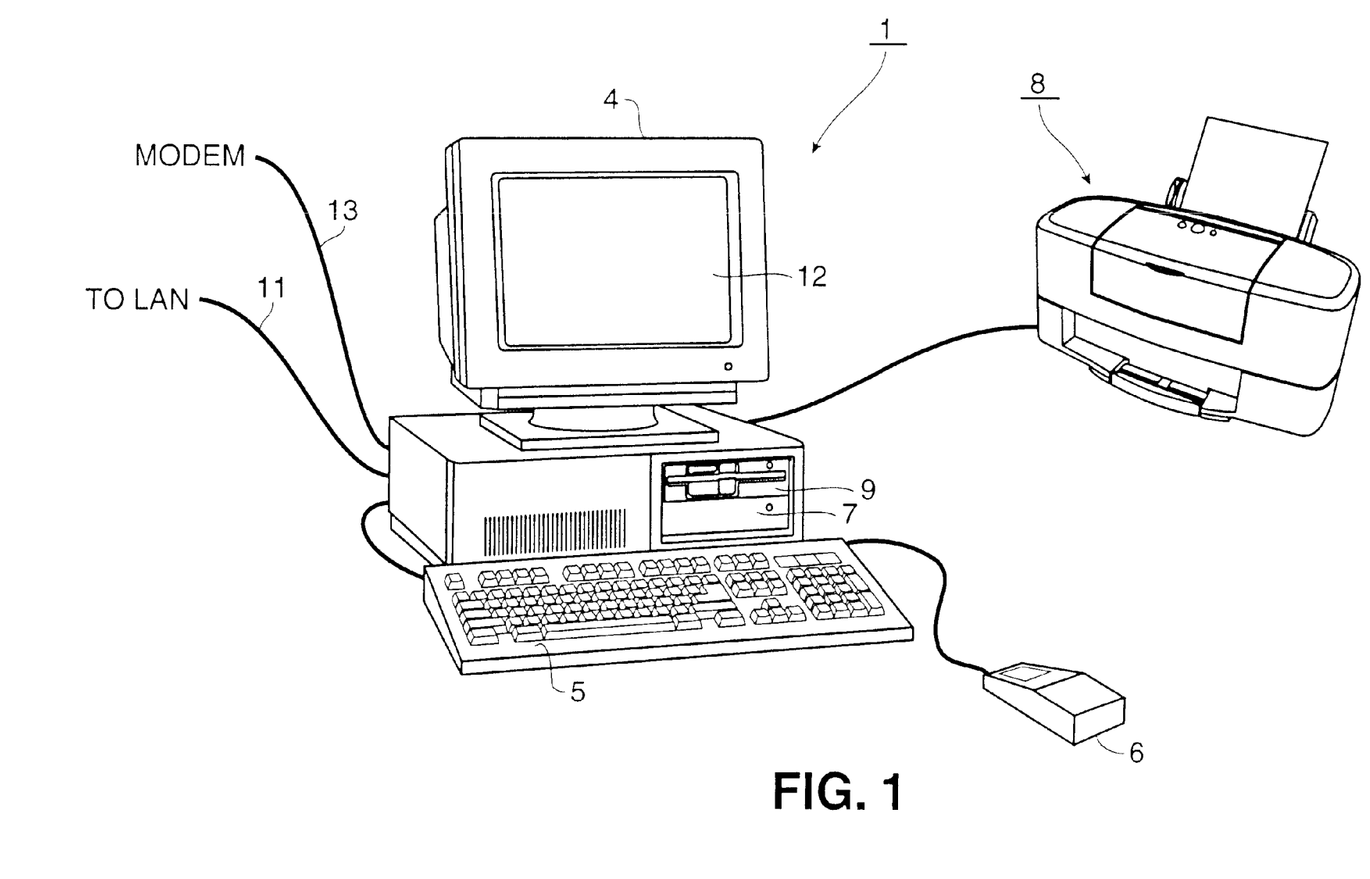
FIG. 1 is a view showing the outward appearance of the representative computing equipment embodying the present invention.

FIG. 1 shows one preferred embodiment of the invention implemented in a general-purpose programmable computer. Shown in FIG. 1, is computing equipment 1, such as an IBM PC or PC-compatible computer having a windowing operating system such as Microsoft Windows operating system. Computing equipment 1 is provided with a display monitor 4 with a display screen 12 on which computing equipment 1 may display documents to a user prior to printing. Computing equipment 1 has a keyboard 5 for permitting input of text data and manipulation of documents displayed on monitor screen 4, and a standalone printing device 8 for printing documents, pointing device 6, a mouse or the like which is also provided to permit manipulation of objects and images on display screen 12. Also provided are connections 11 to a network or the internet, and connection 13 to an ordinary voice telephone line, both for sending and receiving documents as well as other files which include program instruction sequences by which computing equipment 1 is operated.

Computer 1 also includes a computer-readable memory medium such as fixed disk 7 for storing computer-readable data. Fixed disk 7 stores, among other files, application programs by which computer 1 generates files, manipulates files and stores those files on fixed disk 7, displays data in those files to user via display screen 12. Fixed disk 7 also stores an operating system, which as noted above, is preferably a windows operating system.

Computer 1 is further provided with a floppy disk drive 9 that provides a means whereby Computer 1 can access a computer-readable floppy disk storing data files, application program files, computer executable process steps embodying the present invention, or the like. A similar CD-ROM interface (not shown) may also be provided through which Computer 1 can access application program files and data files stored on a CD-ROM.

Figure 2:
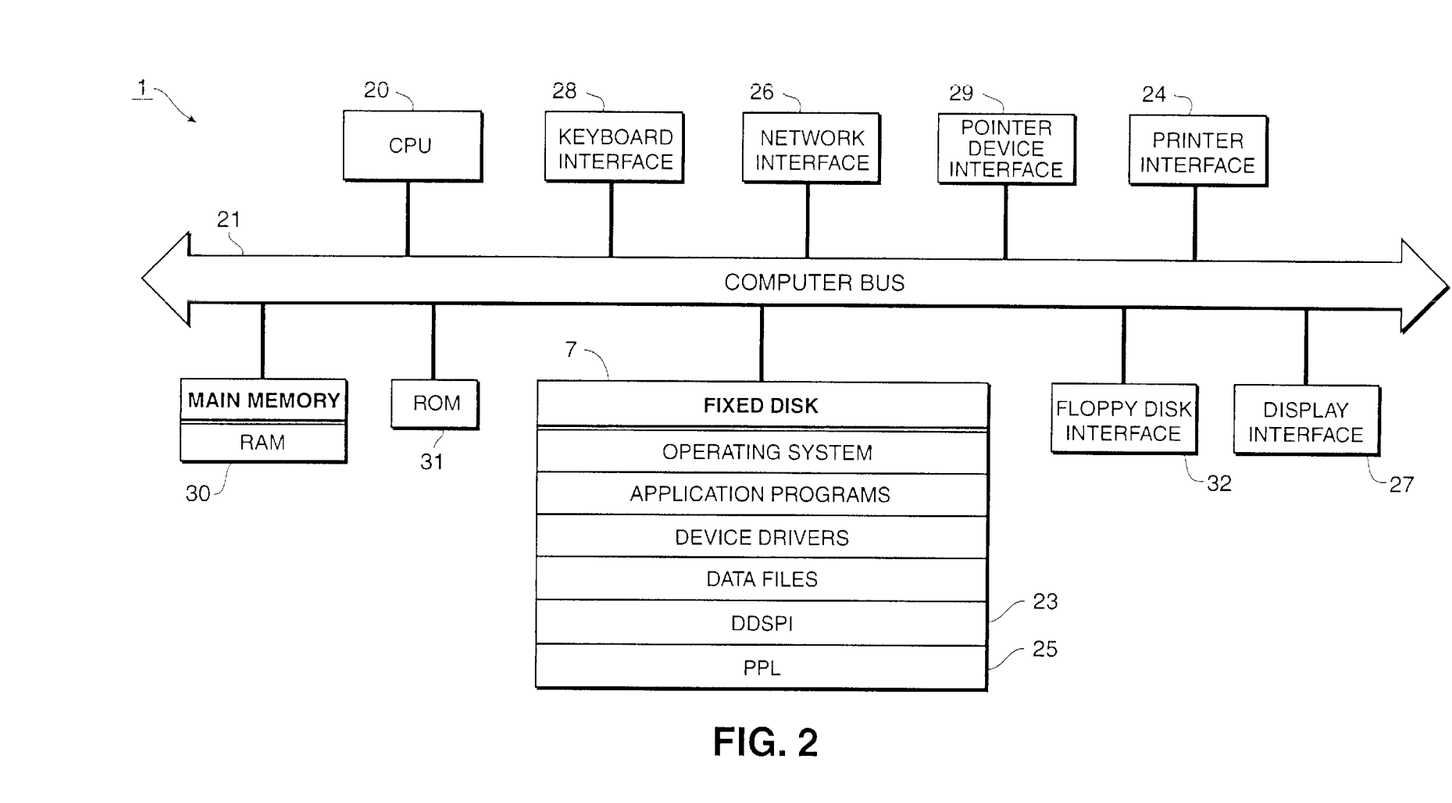
FIG. 2 is a detailed block diagram showing the internal construction of FIG. 1.

FIG. 2 is a detailed block diagram showing the internal construction of computing equipment 1. As shown in FIG. 2, computing equipment 1 includes a central processing unit (CPU) 20, which may be an Intel Pentium microprocessor interfaced with computer bus 21. Also interfaced with the computer bus 21 is a display interface 27, network interface 26, printer interface 24, pointing device interface 29, keyboard interface 28 and floppy disk drive interface 32.

Main memory 30 such as random access memory (RAM) interfaces with computer bus 21 so as to provide random access memory storage for use by CPU 20 when executing stored programs. In particular, when executing stored application program instruction sequences such as those associated with the application programs stored on disk 7, CPU 20 loads those instructions sequences from disk 7 or other storage media such as via the network 11 or floppy disk drive 9, into main memory 30 and executes those stored program instructions out of main memory 30.

ROM (read only memory) 31 is provided for storing invariant instruction sequences such as start-up instruction sequences or basic input/output operating system (BIOS) sequences for operation of keyboard 5.

As shown in FIG. 2 and previously mentioned, fixed disk 7 stores instruction sequences for the windowing operating system and for various application programs such as word-processing, spreadsheets and image processing.

Furthermore, fixed disk 7 may also store a software module, a dynamically distributed shared printer interface (DDSPI) 23 that calculates an estimated workload to print a print job, queries network printer's for printer capability information, compares printer capability information with the estimated workload and routes the print job to the best available printer for the print job. Fixed disk 7, may also store a user defined preferred printer list (PPL) 25, that consists of a list of printers where a user prefers to get it's print jobs printed.

Ordinarily, application programs are stored on floppy disk or other computer readable media or downloaded from the Internet or the network need first to be installed by the user onto disk 7. The user will install the application program. by buying a floppy disk containing the application program, inserting the floppy into floppy disk drive 9 and by commanding CPU 20 to copy floppy disk drive onto fixed disk 7. The user may also download the program via telephone and modem interface (not shown) or via network 11 from a computerized bulletin board.

Figure 3:
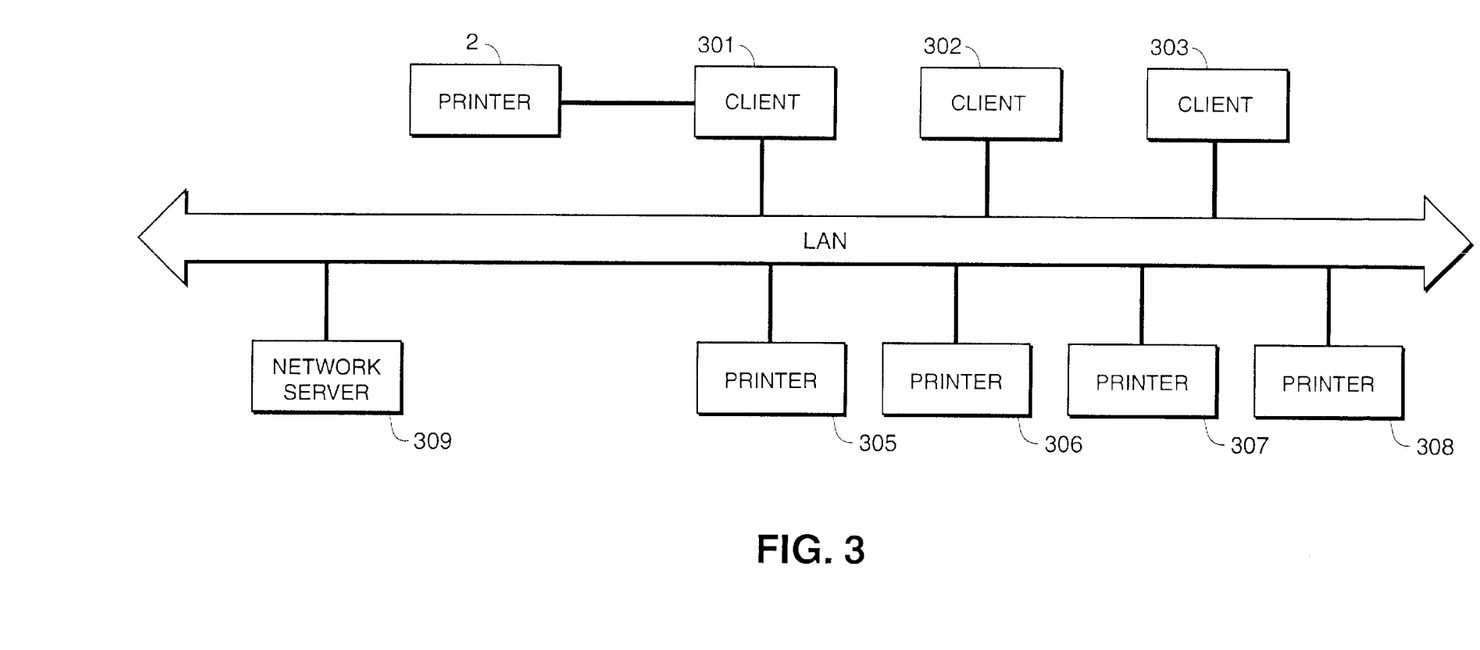
FIG. 3 is a representation of a typical network topology to which the present invention may be applied.
Figure 5:
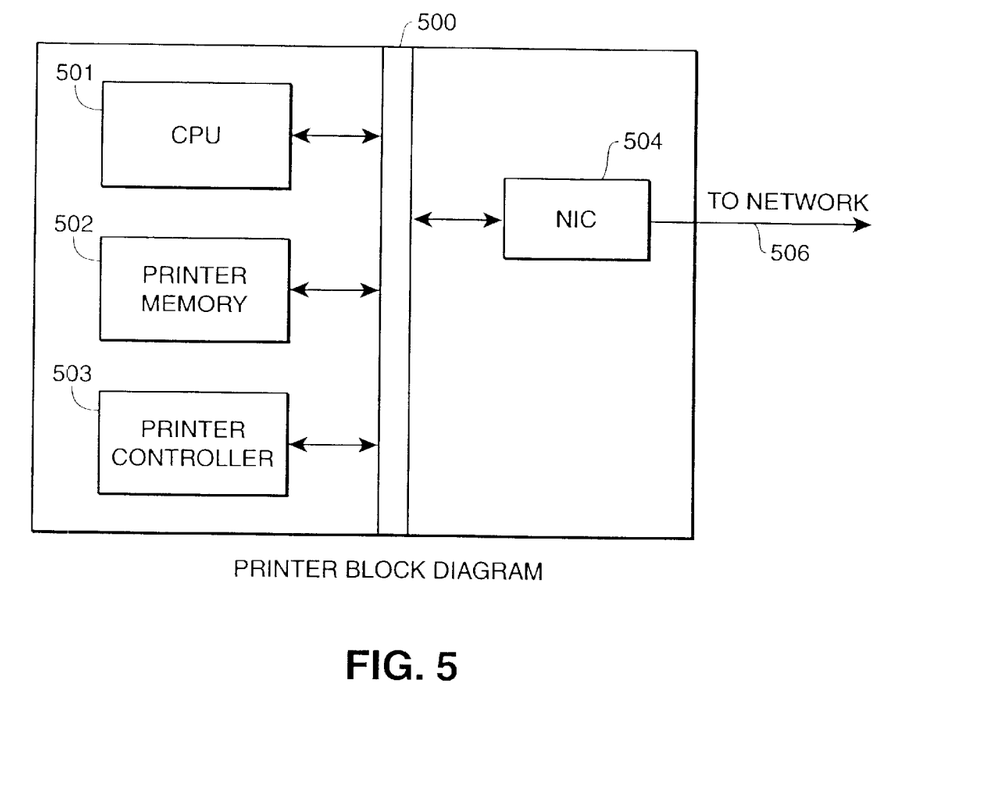
FIG. 5 is a block diagram of a network printer that can calculate it's capability.

FIG. 3 shows a configuration of a commonplace computer network where the present invention may be implemented. Shown in FIG. 3 are computer clients 301, 302, and 303 where the configurations of the client computer systems are similar to the aforementioned configuration of Computer 1. Clients 301, 302, and 303 are connected to the network via network connection similar to network connection 11 and network interface 26. Printers 304, 305, 306, 307 and 308 are also connected to the Local Area Network (LAN) via network Interface card (NIC) similar to NIC 504 as shown in FIG. 5. For illustration purposes, Client 301 also has a standalone printer 2.

FIG. 3 also shows a network server 309, where the configuration of the network server 309, being similar to that of Computer 1, and the DDSPI 23 is stored on the fixed disk of the network server 309 similar to fixed disk 7. Furthermore, a user defined PPL 25 is also stored on the fixed disk of the network server 309.

Figure 4:
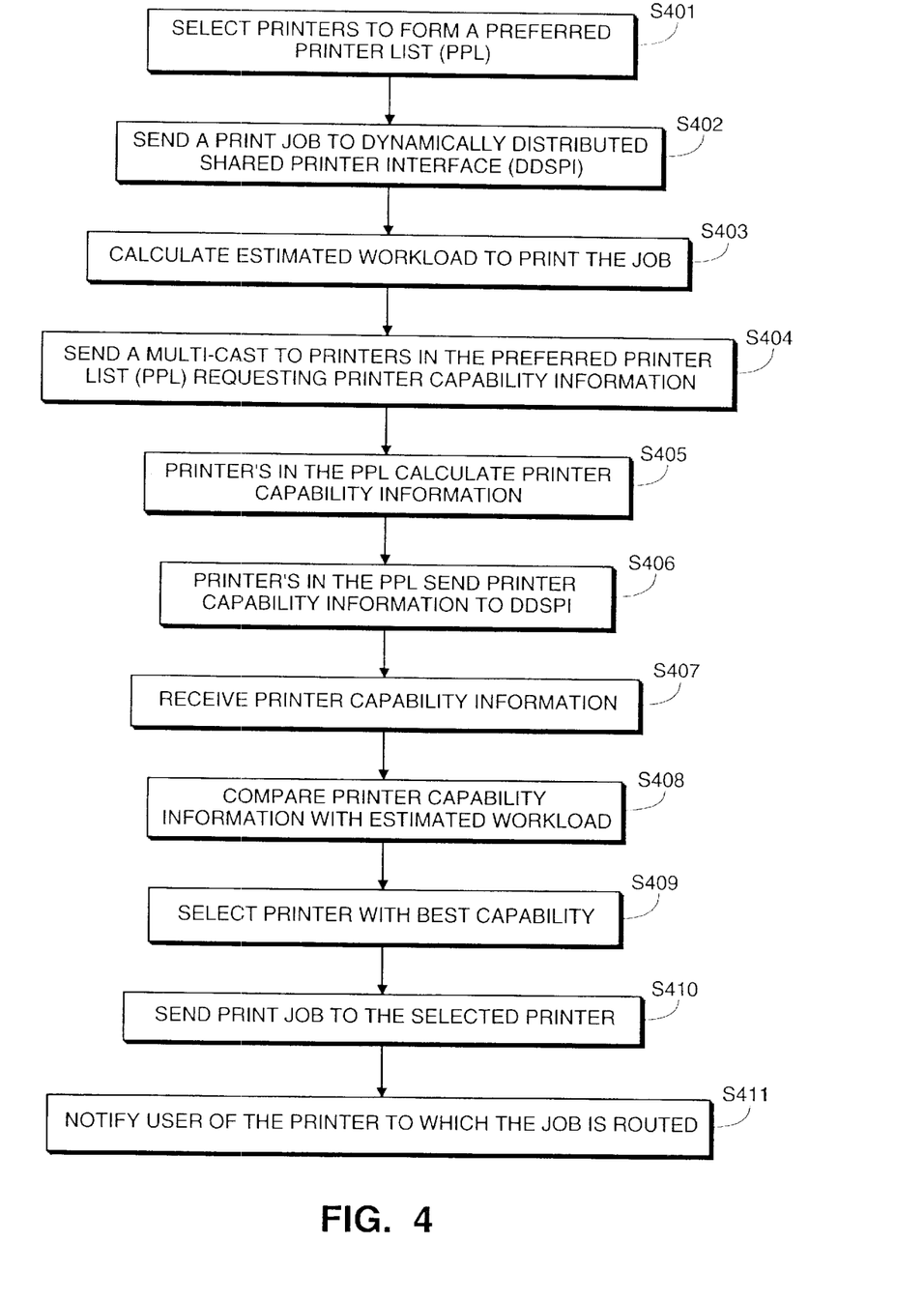
FIG. 4 is a flow diagram showing process steps for routing print jobs in a computer network after dynamically evaluating the capability of network printers.

FIG. 4 is a flow diagram of computer-executable process steps according to the present invention. Preferably, the computer-executable process steps described in FIG. 4 are loaded into RAM 30 and executed therefrom by CPU 20.

Generally, FIG. 4 process steps include selecting user defined preferred printers and storing the preferred printers as a preferred printer list (PPL) 25 on the fixed disk of the network server 309, sending a print job to the DDSPI 23, estimating the workload of the print job, sending a multi-cast to the printers in the PPL 25, calculating the capability of the printers and selecting a printer with the best capability to print the print job.

More particularly, flow begins at step S401 in which a user using Client computer 301 selects a list of preferred printers depending upon the user's preference. In this example, Printers 305, 306, and 307 are selected as the preferred printers, where the user using Client 301 may want it's print jobs to be printed. The list so formed is the user's preferred printer list (PPL) 25. The PPL 25 may be stored on the fixed disk of the network server 309 similar to fixed disk 7. It is noteworthy that the list may be changed or updated at any time by the user using Client 301. After the user has created the PPL 25, it sends a print job to be printed in step S402. The print job in this instance goes to the DDSPI 23 located on the network server 309.

In step S403, the estimated workload for the print job based upon the complexity and size of the print job is calculated and is designated as Task Allocation Property (TAP). The DDSPI 23 determines the size and type of the print job and calculates the TAP for a particular print job. The size and type are important for determining the TAP as illustrated by the following example:

If there are two print jobs P1 and P2, of equal size and P1 has text and P2 has both text and complex graphics, then P2 will have a higher TAP when compared to P1 and hence would require a high-end printer to print.

The TAP is calculated by the DDSPI 23 as following:

$$TAP = w'1S1 + w'2C1/w'1 + w'2 \quad (1)$$

Where S1 is a numerical factor directly proportional to the size of the print job and C1 is a numerical factor based on the complexity of the print job. For example a 1 megabyte print job may have a S1 value of 100 and the value of S1 incrementally increases by 50 for every 0.5 megabyte increase in the print job size. C1 for a postscript print job may have a value of 100, for PCL print job it may be 75 and for a pure text job 50. These values may be experimentally computed by varying the print size and the nature of the print jobs.

Also, w'1 and w'2 are assigned weights used in calculating the TAP. The values of w'1 and w'2 may be experimentally determined by varying print job sizes and the nature of the print jobs from postscript to text.

In step S404, the DDSPI 23 accesses the user's PPL 25 from the network server 309 and sends a network multi-cast to all the printers in the PPL 25, requesting printer capability information. For example in this case DDSPI 23 sends multi-cast to printers 305, 306, and 307.

In step S405, the printers receiving the above mentioned multi-cast calculate their capabilities. For example, printers 305, 306, and 307 calculate their capability at the instance when the multi-cast is received from DDSPI 23. The printer capability is designated as the Printer Power Index (PPI) and in this example PPI's for printers 305, 306 and 307 is denoted as Px, Py and Pz. The printer capability is calculated by a software module designated as CAPI 605 (see FIG. 6) as described in detail in FIG. 7.

Figure 7:
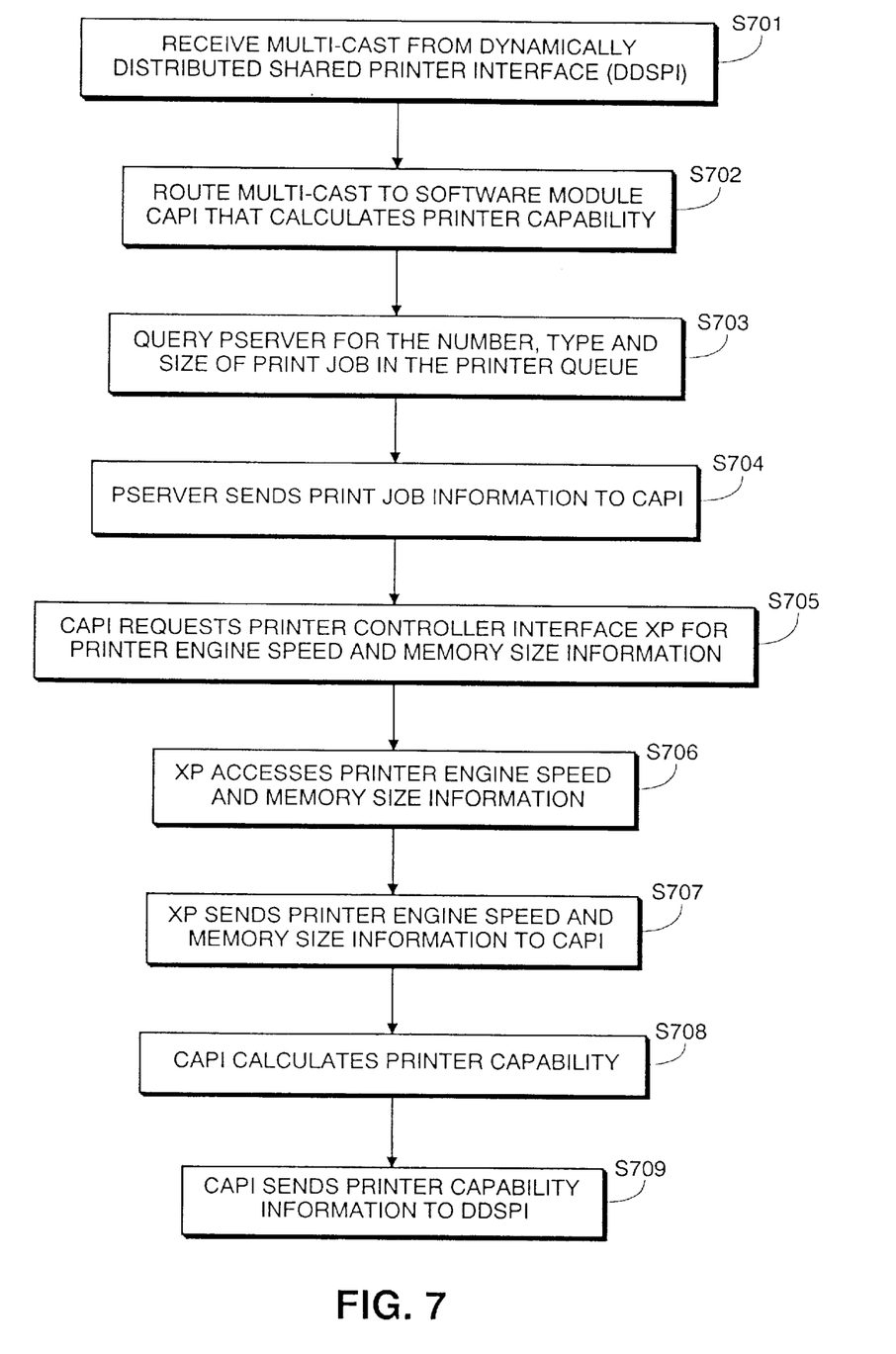
FIG. 7 is a flow diagram showing process steps for calculating printer capability in response to a network multicast.

In step S406, the determined PPI values of the printers as described in FIG. 7 are sent to the DDSPI 23. In the above illustration, printers 305, 306, and 307 send their PPI's to the DDSPI 23.

In step S407, DDSPI 23 receives Px, Py and Pz from the printers 305, 306 and 307 responding to the multi-casts sent by the DDSPI, 23.

In step S408, the DDSPI 23 compares Px, Py, and Pz with the TAP of the print job. Thereafter, in step S409 DDSPI 23 selects the best available printer based upon the received PPI's namely Px, Py and Pz and the TAP of the print job. The printer whose PPI value is closest to the TAP is selected to print the job for example if Px=100, Py=75 and Pz=50 and if the TAP value as calculated in step S402 is 90, then the DDSPI 23, selects printer 305 for the print job because it's PPI is closest to the TAP. Hence the most suitable printer is chosen for the job.

In step S410, the print job is routed to the printer 305 and in step S411, the DDSPI 23 notifies the user using Client computer 301 that the printer 305 has been chosen for the print job, and thereafter the job is printed. However if printer 305 while printing the job, develops an error, a new set of negotiations are required for finding the next best printer in the PPL 25 as described in FIG. 8.

Figure 6:
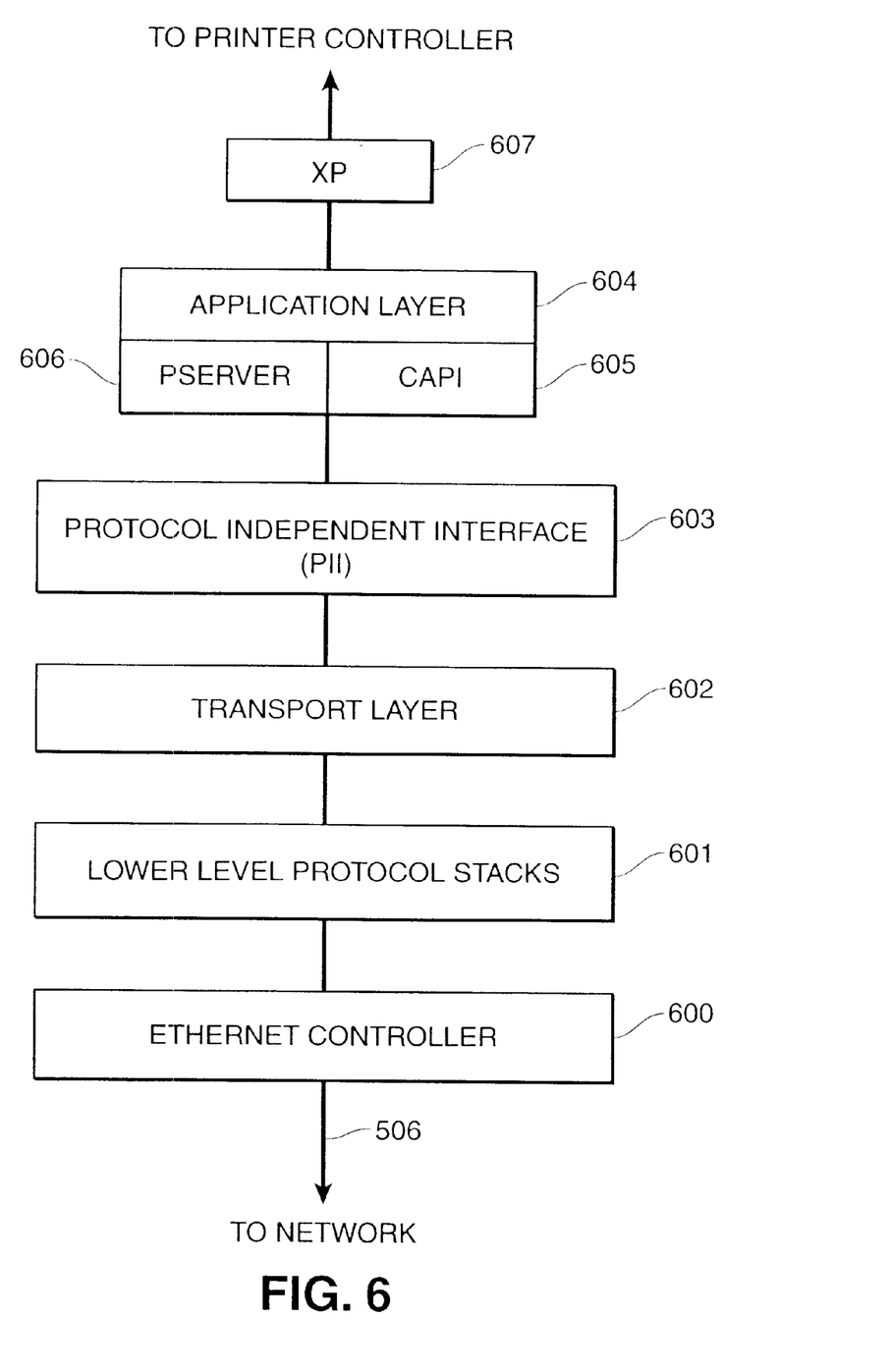
FIG. 6 is a block diagram of a network interface card (NIC) showing the location of a software module (CAPI) that calculates the printer capability in response to a network multi-cast

FIGS. 5 and 6 show the configuration of a typical network printer with a network interface card that can communicate to the DDSPI 23 and calculate it's PPI whenever requested by the DDSPI 23.

FIG. 5 shows a detailed block of a printer for example printer 304 that is connected to the network and can calculate it's PPI upon receipt of a multicast from the DDSPI 23. In more detail printer 304 includes a central processing unit (CPU) 501, which may be an Intel Pentium microprocessor interfaced with a computer bus 500. Also interfaced with the computer bus is printer memory 502, printer controller 503 that has the printer engine speed and printer memory information and Network Interface Card (NIC) 504 that is also connected to the network via network interface connection, 506.

FIG. 6 shows a block diagram of the NIC 504. In more detail, NIC 504 includes an Ethernet Network Controller 600 that receives and routes multi-casts packet from the DDSPI 23, lower level protocol stacks 601 that include physical and data link layers that route the multi-cast packets from the Ethernet Network Controller 600 to the transport layer 602 that includes TCP/IP, NETBIOS/NETBEUI etc. stacks. It is noteworthy that the invention may be practiced using any industry LAN architecture including the International Standard's Organization (ISO) Reference Model for Open Systems Interconnection (OSI). The protocol arrangement includes a Protocol Independent Interface (PII) 603 that routes the multi-cast packets to the Application layers 604.

The application layers, 604 includes software module's PSERVER, 606 and CAPI 605, where PSERVER, 606 has all the information regarding the print jobs waiting in the printer queue and CAPI 605 is a software module that finally gets the multi-cast requesting the printer capability information originally sent by the DDSPI 23, and thereafter calculates the PPI. The NIC 504, includes XP, 607 a software interface that communicates with the print controller 503 and can access printer engine speed and memory size.

FIG. 7 shows in more detail the process steps for calculating the PPI using the printer components described in FIGS. 5 and 6 and based upon various parameters including printer engine speed, printer memory size, number, size and complexity of the print jobs already in the printer queue, when the multi-cast from the DDSPI 23 is received by the printer.

In more detail, in step S701, the multi-cast packet from the DDSPI requesting printer capability index (PPI) is received by the lower level protocol stacks 601 via the Ethernet Network Controller 600 and in step S702 routed to the software module CAPI 605 via the PII 603.

In step S703 CAPI 605 queries the PRINTSERVER 606 to get the number, size and type of print jobs already waiting in the printer queue for printing, prior to the multicast.

In step S704 the PRINTSERVER 606 responds back with the number, size and nature of print jobs waiting in the printer queue.

In step S705, CAPI 605, requests XP 607 for printer engine and memory information and in step S706 XP, 607 accesses the printer memory and printer engine information from the print controller 503 and in step S707, XP 607 provides the same to CAPI 605.

In step S708, CAPI 605 calculates the PPI and it can be calculated by using the following factors: printer engine speed, printer's memory size, number of print jobs in the printer queue, nature and size of the print jobs in the printer queue when the multi-cast is received. The above factors are weighted to determine the Printer Power Index.

The number and the type of print jobs in a printer's queue affect the PPI of the printer, for example if Printer 305 and 306 have the same engine speed and memory size, however when the multicast is received by the printers, 305 has 5 jobs containing text and graphics in the queue and Y, 306 has 1 job containing text only. Hence printer 306 will have a higher PPI than printer 305, therefore Py will be greater than Px making Printer 306 more capable than 305. The process in step S708 is dynamic and real time because the printer's capability to print may change according to the number and complexity of print jobs in the printer queue. CAP I 605, determines the PPI using the following:

$$PPI=We*Ps+Wm*Pm+Ws*Ps+Wt*Pt+Wn*Pn/We+Wm+Ws+Wt+Wn$$

We=Weight given to Printer engine speed

Ps=Numerical value for printer engine speed.

Wm=Weight given to printer memory size.

Pm=Numerical value for printer memory size.

Ws=Weight given to size of a print job waiting to be printed prior to the multi-cast.

Ps=Numerical value for the size of the print job waiting to be printed.

Wt=Weight given to the type of print jobs (for example postscript, PCL or text) waiting to be printed prior to the multi-cast.

Pt=Numerical value for the type of print jobs waiting to be printed, prior to the multi-cast.

Wn=Weight given to the number of print jobs waiting to be printed prior to the multi-cast.

Pn=Number of print jobs waiting to be printed, prior to the multi-cast.

The values for the different weights as shown above may be determined experimentally. It is noted that the above mathematical formula is merely for illustration purposes, other similar mathematical formulas may be used to determine the PPI based upon the above parameters.

In step S709, CAPI 605 sends the calculated PPI to the DDSPI 23 via the network connection 506.

Figure 8:
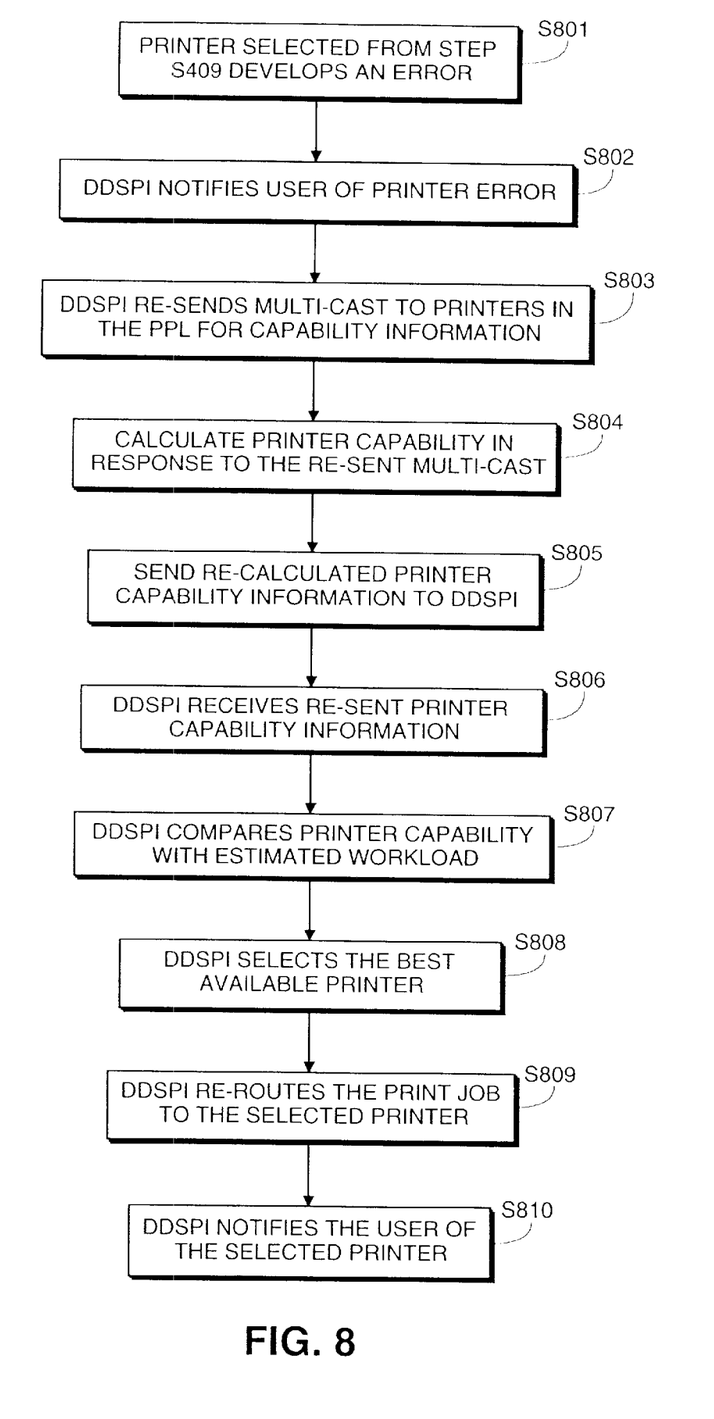
FIG. 8 is a flow diagram showing process steps for re-routing a print job after the printer printing the job develops an error and printing is disrupted.

FIG. 8 is a flow diagram of computer-executable process steps according to the present invention. Preferably, the computer-executable process steps described in FIG. 8 are loaded into RAM 30 and executed therefrom by CPU 20.

Generally, FIG. 8 process steps include notifying a user if a printer performing the network printing job develops an error, re-sending a multi-cast to the other printers in the PPL 25, re-calculating the printer PPI's as described in FIG. 7, re-routing the print job to the best available printer and thereafter notifying the user of the printer identity to which the job is re-routed.

More particularly, flow begins at step S801, where the printer 305, from step S410 of FIG. 4, develops an error. The error could be a paper jam, lack of toner, printer out of paper or any other printer error that prevents the printer from completing the print job.

In step S802, printer 305 notifies the DDSPI 23 of the error. Thereafter, the DDSPI 23 notifies all the users that have a print job in printer 305's queue.

In step S803, the DDSPI 23 re-sends a multi-cast to the other printers in the preferred printer list 25 requesting printer capability information. In this illustration, a multi-cast is re-sent to printers 306 and 307.

In step S804,the printers receiving the above mentioned re-sent multicast calculate their capabilities as shown in FIG. 7. For example, printers 306, and 307 re-calculate their capability at the instance when the second multicast is received from DDSPI 23 and may be-designated as Py' and Pz'.

In step S805, the PPI values of the printers responding to the multi-cast are re-sent to the DDSPI 23. In the above illustration, printers 306 and 307 send their PPI to the DDSPI 23.

In step S806, the DDSPI 23 receives Py' and Pz' from the printers 306 and 307, responding to the re-sent multi-cast and in step S807, the DDSPI 23 compares Py', and Pz' to the TAP of the user requested print job as calculated in step S403 of FIG. 4. Thereafter, in step S808, DDSPI 23 selects the best available printer based upon the resent PPI's namely Py' and Pz' and the TAP of the print job. For example in this illustration if Py' is closer to the TAP than Pz', then DDSPI 23, selects printer 306 for the print job. The selection process is similar to that of step S408 in FIG. 4.

In step S809, the print job is routed to the printer 305 and thereafter in step S810, the DDSPI 23, renotifies the client/user of the printer chosen for the print job after the original printer 305, develops an error and in this example it is printer 306. The DDSP 23 performs the same tasks for other print jobs waiting in the printer 305 queue as described in FIG. 8.

Finally, while the present invention is described above with what is currently considered its preferred embodiments, it is to be understood that the invention is not limited to that described above. To the contrary, the invention is intended to cover various modifications and equivalent arrangements included within the spirit and scope of the appended claims. For example, DDSPI 23 may be located on a client computer 301 instead of the network server 309 and perform the same functionality as described above in FIGS. 4, 7 and 8.

What is claimed is:

1. A method for routing print jobs in a computer network having a plurality of printers with user defined preferred printer list (PPL) and a dynamically distributed shared printer interface (DDSPI) that routes a print job to a printer based upon the printer's capability, comprising the steps of:
    estimating a work load to print a print job, wherein the estimated work load is calculated by the DDSPI;
    transmitting a multi-cast to the printers in the PPL requesting printer capability information, wherein the multicast is transmitted by the DDSPI;
    receiving printer capability information, wherein the printer capability information is received by the DDSPI;
    selecting the printer based on the printer capability information that best matches the estimated work load of the print job; and
    routing the print job to the selected printer.

2. A method according to claim 1, wherein the estimated workload to print the print job is contained within a task allocation property based upon the complexity of the print job.

3. A method according to claim 1, wherein the estimated workload to print the print job is contained within a task allocation property based upon the size of the print job.

4. A method according to claim 1, wherein the printer capability information is contained within a printer power index based on the printer engine speed.

5. A method according to claim 1, wherein the printer capability information is contained within a printer power index based on the printer memory size.

6. A method according to claim 1, wherein the printer capability information is contained within a printer power index based on the number of print jobs in the printer queue.

7. A method according to claim 1, wherein the printer capability information is contained within a printer power index based on the size of print jobs in the printer queue.

8. A method according to claim 1, wherein the printer capability information is contained within a printer power index based on the complexity of print jobs in the printer queue.

9. A method according to claim 1, further comprising the steps of:
    comparing the received printer power index with the task allocation property, wherein the DDSPI compares the PPI with the TAP; and
    notifying the user of the printer to which the print job is sent, wherein the user is notified by the DDSPI.

10. A method for re-routing a print job in a computer network having a plurality of printers with a user defined preferred printers list (PPL) and a dynamically distributed shared printer interface (DDSPI) that receives a print job and calculates the print job's estimated work load designated as a task allocation property and where a printer from a PPL is unable to print a job due to printer error, comprising the steps of:
    notifying the DDSPI when the printer printing the print job develops an error during printing, wherein the printer that develops the error notifies the DDSPI;
    transmitting a multi-cast requesting printer capability information to the other printers in the PPL, wherein the DDSPI sends the multicast;
    receiving printer capability information from the printers responding to the multi-cast, wherein the printer capability information is received by the DDSPI;
    selecting the printer whose capability best matches the estimated workload; and
    re-routing the print job to the selected printer.

11. A method according to claim 10, wherein the printer capability information is contained within a printer power index based upon the printer engine speed.

12. A method according to claim 10, wherein the printer capability information is contained within a printer power index based upon the printer memory size.

13. A method according to claim 10, wherein the printer capability information is contained within a printer power index based upon the complexity of print jobs in the printer queue.

14. A method according to claim 10, wherein the printer capability information is contained within a printer power index based upon the number of print jobs in the printer queue.

15. A method according to claim 10, wherein the printer capability information is contained within a printer power index based upon the size of print jobs in the printer queue.

16. A method according to claim 10, further comprising of:
    comparing the received printer power index with the task allocation property, wherein the DDSPI compares the PPI with the TAP; and
    notifying the user after the print job is re-routed, wherein the user is notified by the DDSPI.

17. A printing interface for allocating print jobs in a computer network having a user defined preferred printer list (PPL) where the printers in the PPL can calculate their own capability designated as printer power index (PPI) in response to a multi-cast at any given time, comprising of:
    a dynamically distributed shared printing interface (DDSPI), wherein the DDSPI receives print jobs from the users, calculates the estimated workload of the print job based upon the size and complexity of the print job, transmits a multi-cast to the printers in the PPL requesting printer capability information and receives the printer capability (PPI) information from the printers in the PPL.

18. The interface according to claim 17, wherein the estimated workload of the print job is designated as a task allocation property.

19. The interface according to claim 17, wherein the PPI depends upon the printer engine speed.

20. The interface according to claim 17, wherein the PPI depends upon the printer memory size.

21. The interface according to claim 17, wherein the PPI depends upon number of the print jobs in the printer queue.

22. The interface according to claim 17, wherein the PPI depends upon the complexity of the print jobs in the printer queue.

23. The interface according to claim 17, wherein the PPI depends upon the size of the print jobs in the printer queue.

24. The interface according to claim 17, wherein the DDSPI compares the PPI with the task allocation property and routes the print job to a printer with a PPI closest to the TAP and notifies the user of the printer to which the print job is routed.

25. A printing system for allocating print jobs in a computer network having a plurality of printers in a user defined preferred printers list (PPL) where the printers can calculate their own capability designated as a printer power index (PPI), comprising of:
    a dynamically distributed shared printer interface (DDSPI), wherein the DDSPI receives a print job prior to printing, estimates the workload to print the job, sends a multicast to the printers in the preferred printer list and routes the print job to the printer whose PPI best matches the estimated workload; and a network printer, wherein the network printer receives the multi-cast from the DDSPI, calculates the PPI and sends the PPI to the DDSPI.

26. The system according to claim 25, wherein the estimated workload of the print job designated as task allocation property is based upon the size of the print job.

27. The system according to claim 25, wherein the estimated workload of the print job designated as task allocation property is based upon the complexity of the print job.

28. The system according to claim 25, wherein the DDSPI compares the received PPI from the network printer to the TAP and notifies the user of the printer to which the print job is sent.

29. The system according to claim 25, wherein the printer power index is based upon the printer engine speed.

30. The system according to claim 25, wherein the printer power index is based upon the printer memory size.

31. The system according to claim 25, wherein the printer power index is based upon the number of print jobs in the printer queue.

32. The system according to claim 25, wherein the printer power index is based upon the complexity of print jobs in the printer queue.

33. The system according to claim 25, wherein the printer power index is based upon the size of print jobs in the printer queue.

34. A printing system in a computer network having user defined preferred printer list (PPL) and a dynamically distributed printing interface (DDSPI) that allocates a print job to a printer based upon the printer's capability at a given time, comprising of:

a network printer that calculates its capability in response to a multicast from the DDSPI requesting printer capability information, wherein the printer capability is designated as a printer power index and is based upon the printer engine speed.

35. The system according to claim 34, wherein the printer power index is based upon the printer memory size.

36. The system according to claim 34, wherein the printer power index is based upon the number of print jobs in the printer queue.

37. The system according to claim 34, wherein the printer power index is based upon the complexity of print jobs in the printer queue.

38. A method for calculating printer capability of a network printer having a user defined preferred printer list (PPL) in response to a multi-cast sent by a dynamically distributed shared printer interface (DDSPI) that routes print jobs to a printer with the optimum capability to print a job, comprising the steps of:

receiving the multi-cast from the DDSPI for printer capability information; and calculating the printer capability, wherein the printer capability is based upon printer engine speed.

39. The method according to claim 38, wherein the printer capability is based upon printer memory size.

40. The method according to claim 38, wherein the printer capability is based upon the number and complexity of print jobs in the printer queue.

41. Computer-executable process steps stored on a computer-readable medium, the computer executable process steps for routing print jobs in a computer network having a plurality of printers with user defined preferred printer list (PPL) and a dynamically distributed shared printer interface (DDSPI) that routes a print job to a printer based upon the printer's capability, the computer-executable process steps comprising:

code to estimate work load of a print job, wherein the estimated work load is calculated by the DDSPI;

code to transmit a multi-cast to the printers in the PPL requesting printer capability information, wherein the multicast is transmitted by the DDSPI;

code to receive printer capability information, wherein the printer capability information is received by the DDSPI; and code to select the printer with the capability that best matches the estimated work load of the print job.

42. Computer-executable process steps according to claim 41, wherein the estimated workload of the print job is contained within a task allocation property based upon the complexity of the print job.

43. Computer-executable process steps according to claim 41, wherein the estimated workload of the print job is contained within a task allocation property based upon the size of the print job.

44. Computer-executable process steps according to claim 41, wherein the printer capability information is contained within a printer power index based upon the printer engine speed.

45. Computer-executable process steps according to claim 41, wherein the printer capability information is contained within a printer power index based upon the printer memory size.

46. Computer-executable process steps according to claim 41, wherein the printer capability information is contained within a printer power index based upon the number of print jobs in the printer queue.

47. Computer-executable process steps according to claim 41, wherein the printer capability information is contained within a printer power index based upon the complexity of print jobs in the printer queue.

48. Computer-executable process steps according to claim 41, wherein the printer capability information is contained within a printer power index based upon the size of print jobs in the printer queue.

49. Computer-executable process steps according to claim 41, further comprising of:

code to compare the received printer power index with the task allocation property, wherein the DDSPI compares the PPI with the TAP; and code to notify the user of the printer to which the print job is sent, wherein the user is notified by the DDSPI.

50. Computer-executable process steps stored on a computer-readable medium, the computer executable process steps for re-routing a print job in a computer network having a plurality of printers with a user defined preferred printers list (PPL) and a dynamically distributed shared printer interface (DDSPI) that receives a print job and calculates the print job's estimated work load designated as a task allocation property and where a printer from a PPL is unable to print a job due to printer error, computer executable process steps comprising:

code to notify the DDSPI when the printer printing the print job develops an error;

code to transmit a multi-cast requesting printer capability information to the other printers in the PPL, wherein the DDSPI sends the multicast;

code to receive printer capability information from the printers responding to the multi-cast, wherein the printer capability information is received by the DDSPI;

code to select the printer whose capability best matches the estimated workload; and code to re-route the print job to the selected printer.

51. Computer-executable process steps according to claim 50, wherein the printer capability information is contained within a printer power index based upon the printer engine speed.

52. Computer-executable process steps according to claim 51, wherein the printer capability information is contained within a printer power index based upon the printer memory size.

53. Computer-executable process steps according to claim 51, wherein the printer capability information is contained within a printer power index based upon the number of print jobs in the printer queue.

54. Computer-executable process steps according to claim 51, wherein the printer capability information is contained within a printer power index based upon the complexity of print jobs in the printer queue.

55. Computer-executable process steps according to claim 51, wherein the printer capability information is contained within a printer power index based upon the size of print jobs in the printer queue.

56. Computer-executable process steps according to claim 51, further comprising of:

code to compare the received printer power index with the task allocation property, wherein the DDSPI compares the PPI with the TAP; and code to notify the user after the print job is re-routed, wherein the user is notified by the DDSPI.

57. Computer-executable process steps stored on a computer-readable medium, the computer executable process steps for calculating printer capability of a network printer having a user defined preferred printer list (PPL) in response to a multi-cast sent by a dynamically shared printer interface (DDSPI) that routes print jobs to a printer with the optimum capability to print a job, the computer-executable process steps comprising of:

code to receive the multi-cast from the DDSPI, requesting printer capability information; and code to calculate the printer capability, wherein the printer capability is based upon the printer engine speed.

58. Computer-executable process steps according to claim 57, wherein the printer capability is based upon the printer memory size.

59. Computer-executable process steps according to claim 57, wherein the printer capability is based upon the number of print jobs in the printer queue.

60. Computer-executable process steps according to claim 57, wherein the printer capability is based upon the complexity of print jobs in the printer queue.

61. Computer-executable process steps according to claim 57, wherein the printer capability is based upon the size of print jobs in the printer queue.

* * * * *